United States Patent [19]

Lim

[11] Patent Number: 5,508,746
[45] Date of Patent: *Apr. 16, 1996

[54] ADVANCED TELEVISION SYSTEM

[75] Inventor: Jae S. Lim, Winchester, Mass.

[73] Assignee: Massachusetts Institute of Technology, Cambridge, Mass.

[*] Notice: The term of this patent shall not extend beyond the expiration date of Pat. No. 5,408,270.

[21] Appl. No.: 340,771

[22] Filed: Nov. 16, 1994

Related U.S. Application Data

[63] Continuation of Ser. No. 83,723, Jun. 24, 1993, Pat. No. 5,408,270.

[51] Int. Cl.$^6$ .................................................. H04N 7/26
[52] U.S. Cl. ..................... 348/429; 348/432; 348/433; 381/2
[58] Field of Search ................................. 348/426, 427, 348/429, 432, 433; 381/2; H04N 7/08, 7/26

[56] References Cited

U.S. PATENT DOCUMENTS

| | | | |
|---|---|---|---|
| 4,794,456 | 12/1988 | Tsinberg | 358/141 |
| 4,985,767 | 1/1991 | Haghiri et al. | 348/429 |
| 5,008,746 | 4/1991 | Bernard et al. | 348/429 |
| 5,053,859 | 10/1991 | Lucas | 348/427 |
| 5,055,927 | 10/1991 | Keesen et al. | 358/133 |
| 5,075,773 | 12/1991 | Pullen et al. | 348/432 |
| 5,128,791 | 7/1992 | LeGall et al. | 348/426 |
| 5,285,498 | 2/1994 | Johnston | 381/2 |
| 5,408,270 | 4/1995 | Lim | 348/429 |

OTHER PUBLICATIONS

Faroudja et al., "A Progress Report on Improved NTSC", SMPTE Journal, pp. 817–822 (Nov. 1989).
Faroudja et al., "Improving NTSC to Achieve Near-RGB Performance", SMPTE Journal, pp. 750–761 (Aug. 1987).
Hurst, "Interlace to Progressive Migration for the Transmission Path", David Sarnoff Research Center (1993).
"Channel Compatible DigiCipher HDTV System", Submitted by Massachusetts Institute of Technology, on behalf of The American Television Alliance (May 14, 1992).
Puri, "Picture Format Scalable Coding for HDTV", ISO/IEC JTC1/SC29/WG11, MPEG 1993/390, Sydney, Australia (Mar. 1993).

*Primary Examiner*—Howard W. Britton
*Attorney, Agent, or Firm*—Fish & Richardson

[57] ABSTRACT

A method for incorporating future developments in video compression technology to migrate toward a better television system in a receiver-compatible manner. The invention uses enhancement data that can be combined with standard video data. Standard HDTV receivers will utilize standard video data, ignoring the enhancement data. More advanced HDTV receivers will combine the enhancement data with standard data. The television signal is transmitted in a format comprising a first set of bits that represents images at a first quality (e.g., first resolution) and that can be decoded to provide an output at the first resolution, and a second set of bits that represents enhancement information and that can be decoded and used in conjunction with the first set of bits to provide an output at a second resolution greater than the first resolution. The first set of bits is decoded according to a first decoding procedure to provide information representative of images at the first resolution. The second set of bits is decoded according to a second decoding procedure to provide the enhancement information. And at least some of the enhancement information and at least some of the information representative of images at the first resolution are used to provide the output at the second resolution.

56 Claims, 9 Drawing Sheets

ADVANCED TELEVISION SYSTEM

This is a continuation of application Ser. No. 08/083,723, filed Jun. 24, 1993, now U.S. Pat. No. 5,408,270.

BACKGROUND OF THE INVENTION

This invention relates to image transmission or storage systems, such as high definition television (HDTV), digital NTSC, and other advanced television systems.

The desired resolution goal for terrestrial HDTV broadcasting within a single 6 MHz channel is approximately 1000 lines (e.g., 960 lines or 1080 lines) with progressive scanning (PS) at 60 frames/sec. Unfortunately, presently available technology is not capable of meeting that goal, and thus it is expected that the transmission formats selected for the HDTV standard will either have fewer lines, fewer frames/sec, or use interlaced (IS) scanning instead of progressive scanning (PS). For example, one proposed set of standard formats is shown in Table 1:

TABLE 1

One Proposed Set Of HDTV Standard Transmission Formats

| Spatial Resolution | Frame Rate | Scan Format |
|---|---|---|
| 720 × 1280 pixels | 60 frames/sec | PS |
| 720 × 1280 pixels | 30 frames/sec | PS |
| 720 × 1280 pixels | 24 frames/sec | PS |
| 1080 × 1920 pixels | 30 frames/sec | PS |
| 1080 × 1920 pixels | 24 frames/sec | PS |
| 1080 × 1920 pixels | 60 fields/sec | IS |

The reason why the desired 1080 lines, 60 frames/sec, and PS scan format may not be included in the HDTV standard is that to transmit such a format using today's video compression technology requires more bits per second than can be accommodated in the available channel bandwidth. Typical HDTV images are expected to have a 16:9 aspect ratio with square pixels, and thus the total number of pixels/sec in a format having 1080 lines, 1920 pixels/line, and PS at 60 frames/sec is approximately 125 Mpixels/sec. The technologies such as QAM and VSB proposed for HDTV transmission over the air provide approximately 27 Mbits/sec (5 bits/Hz for 32-QAM with 5.4 MHz of usable bandwidth) with reasonable coverage area. Excluding the bit capacity needed for error correction, audio, auxiliary data, etc., the total number of bits available for encoding the video data is around 18–20 Mbits/sec or about 0.14 to 0.16 bits/pixel, which is too low for the proposed video compression methods (motion-compensated DCT) to operate successfully without significant video quality degradation. By adopting formats with fewer overall pixels/sec, e.g., those in Table 1, it is presently possible to achieve acceptable video quality.

This presents a difficult problem, for by adopting standard transmission formats now, the benefits of future improvements in video compression methods could be foreclosed to consumers, as it is highly unlikely that the formats adopted today for HDTV will be changed anytime soon. Just as the NTSC format remained the standard for decades, it can be expected that the new HDTV standard will be in place for a long period of time.

One possible solution would be to include one or more higher resolution formats within the HDTV standard (e.g., a 1080 line, 60 frame/sec, PS format), and reserve its use for a future time when video compression techniques would make it possible. But that would be prohibitively costly, as all receivers would have to be built with the greater processor speeds and memory capacities necessary to handle the higher resolution formats, and no immediate advantage would be achieved.

Hurst, "Interlace to Progressive Migration for the Transmission Path", David Sarnoff Research Center (1993) and Puri, Atul, "Picture Format Scalable Coding for HDTV," ISO/IEC JTC1/SC29/WG11, MPEG 1993/390, Sydney, Australia (March 1993), discloses a technique that encodes a progressively scanned video with a method used for encoding an interlaced scanned video. In this method, the original progressive signal is converted to interlaced format, and both the interlaced signal and an enhancement signal (generated at the transmitter based on a comparison of the output of an interlace-to-progressive interpolator and the original progressive input) are transmitted. One objective of this method is to allow less expensive receivers to use only the interlaced signal and more expensive receivers to use the full progressive signal.

SUMMARY OF THE INVENTION

The invention provides a way for future improvements in video compression technology to be used to enhance image quality, e.g., to enhance resolution, while maintaining compatibility with receivers designed to receive transmissions complying with the original HDTV standard.

The invention takes advantage of the fact that the HDTV standard to be adopted by the FCC will standardize some elements but leave other elements open. For example, the FCC is likely to decide on what transmission formats are allowed, but may not decide how video data should be converted to one of the allowed transmission formats. And the FCC is likely to decide that encoding is to be done by a motion-compensated DCT, and that the motion vectors must be represented as particular strings of bits, but it is likely not to decide how the motion vectors are estimated. By leaving some elements of the standard HDTV encoder open, there is room for researchers and manufacturers to improve the video compression, and thereby free up bits for the enhancement techniques of the invention.

The invention provides a method for incorporating future developments in video compression technology to migrate toward a better television system in a receiver-compatible manner. The invention uses enhancement data that can be combined with standard video data. Standard HDTV receivers will utilize standard video data, ignoring the enhancement data. More advanced HDTV receivers will combine the enhancement data with standard data.

In a first aspect, the invention features receiving and decoding a television signal representing an input video source, wherein the television signal has been transmitted in a format comprising a first set of bits that represents images at a first resolution (or other aspect of image quality) and that can be decoded to provide an output at the first resolution, and a second set of bits that represents enhancement information and that can be decoded and used in conjunction with the first set of bits to provide an output at a second resolution greater than the first resolution. The first set of bits is decoded according to a first decoding procedure to provide information representative of images at the first resolution. The second set of bits is decoded according to a second decoding procedure to provide the enhancement information. And at least some of the enhancement information and at least some of the information representative of images at the first resolution are used to provide the output at the second resolution.

In preferred embodiments, the step of decoding the second set of bits comprises the steps of decoding a portion of the bits to provide information representative of the prediction method to be used to transform images from the first to the second resolution, and using the information representative of the prediction method to select from among a plurality of prediction methods; and the step of using at least some of the enhancement information comprises the step of using the selected prediction method to generate the output at the second resolution. The set of prediction methods from which a selection can be made include, for example, in the case of deinterlacing, spatial processing, temporal processing, and the parameters associated with spatial and temporal processing, such as filter size and filter coefficients.

In other preferred embodiments, the step of using at least some of the enhancement information further comprises the steps of decoding the enhancement information to provide an identification of the type of prediction method used in the encoder, using the identification to select the prediction method to be used in decoding, and using the prediction method to process the information representative of images at the first resolution to form predictions of images at the second resolution. In some embodiments, the predictions of images at the second resolution are used as the output at the second resolution. In other embodiments, the step of decoding the enhancement information further includes the steps of decoding a residual computed at the transmitter that represents the difference between predictions of images at the second resolution, generated using the prediction method, and images at the resolution of the video input source; and combining the decoded residual and the predictions of images at the second resolution to form the output at the second resolution.

In preferred embodiments, the prediction method uses spatial interpolation, temporal interpolation, or scanning format conversion (e.g., interlaced to progressive). The spatial and temporal interpolation method may include filtering. Preferably, in the case of deinterlacing, the enhancement information includes information representative of the type of deinterlacing used in the method.

In some preferred embodiments, the television signal has been transmitted using a third set of bits that represents second enhancement information and that can be decoded and used in conjunction with the first and second sets of bits to provide an output at a third resolution greater than the first and second resolutions, and the method of decoding comprises the steps of decoding the third set of bits according to a third decoding procedure to provide the second enhancement information; using at least some of the second enhancement information, and at least some of the first-mentioned enhancement information, and at least some of the information representative of images at the first resolution to provide the output at the third resolution.

In a second aspect, the invention features a method of receiving and decoding the audio portion of a television signal, the audio portion representing an input audio source, wherein the audio portion of the television signal has been transmitted in a format comprising a first set of bits that represents audio at a first resolution and that can be decoded to provide an output at the first resolution, and a second set of bits that represents enhancement information and that can be decoded and used in conjunction with the first set of bits to provide an audio output at a second resolution greater than the first resolution. The method of receiving and decoding comprises the steps of decoding the first set of bits according to a first decoding procedure to provide information representative of audio at the first resolution, decoding the second set of bits according to a second decoding procedure to provide the enhancement information, and using at least some of the enhancement information and at least some of the information representative of audio at the first resolution to provide the output at the second resolution.

In a third aspect, the invention features a method of encoding a television signal representing an input video source. The method comprises the steps of using a first transmission standard to encode the input video source to produce an encoded signal, the encoded signal being of a lower resolution (or other quality) than the resolution of the input video source, and using a second transmission standard to encode enhancement bits to permit the decoder to enhance the signal decoded from the encoded signal. The second transmission standard comprising the steps of decoding the encoded signal to produce an estimate of the signal that would be decoded in a receiver, processing the estimate with a prediction method to produce a predicted signal for the input video source, comparing the predicted signal to the input video source and using the result of the comparison to vary the prediction method to reduce variation between the predicted signal and the input video source, and encoding information representative of the prediction method for use by the decoder.

In preferred embodiments, the prediction method comprises spatial interpolation. And the encoding performed under the first transmission standard includes subsampling the input video source, or converting the video source to a lower resolution scanning format, to thereby reduce its resolution to one of a set of standard resolutions of the first transmission standard. The input video source may be subsampled either spatially or temporarily. The prediction method comprises interpolation corresponding to the subsampling performed as part of the first transmission standard. For example, where the subsampling is spatial subsampling, the prediction method would comprise spatial interpolation.

In a fourth aspect, the invention features transmitting a television signal representing an input video source, by transmitting a first set of bits that represents images at a first quality and that can be decoded to provide an output at the first quality, and transmitting a second set of bits that represents enhancement information and that can be decoded and used in conjunction with the first set of bits to provide an output at a second quality greater than the first quality.

Other features and advantages of the invention will be apparent from the following description of preferred embodiments and from the claims.

DESCRIPTION OF THE PREFERRED EMBODIMENTS

Figure 1A:
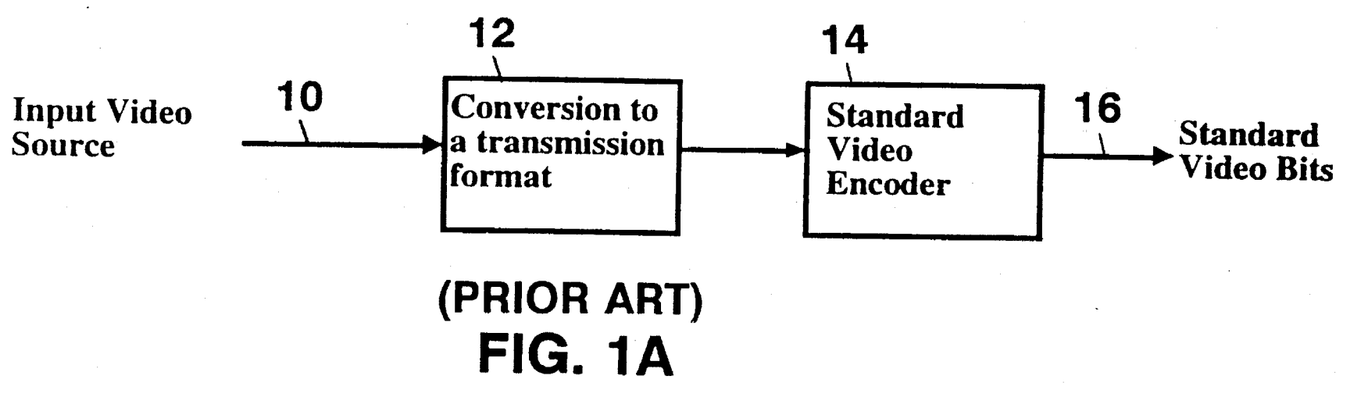
FIGS. 1A and 1B are block diagrams of a prior art HDTV transmitter and receiver.
Figure 1B:
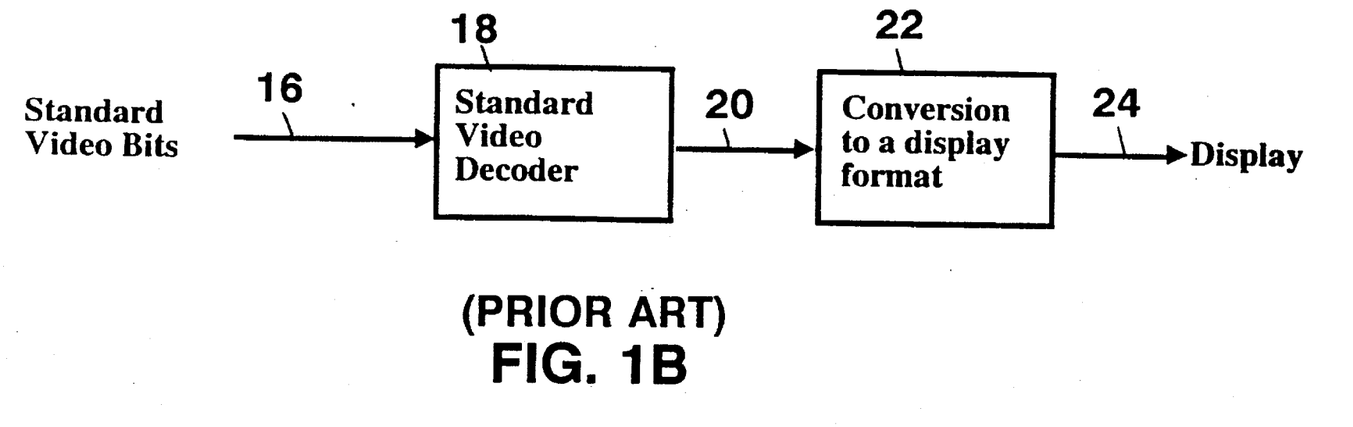

FIG. 1 shows a standard HDTV system prior to the application of the invention. At the transmitter (FIG. 1A), the input video source 10 is first converted (at 12) to one of the allowed transmission formats (e.g., one of the formats of Table 1). The transmission format is typically chosen to be close to the input video source format for maximum efficiency in video compression. The video compression method established in the standard is used to encode the video data (at 14). The result is a string of bits, which will be referred to as the standard video bits 16. At the receiver (FIG. 1B), the standard video bits are decoded (at 18) using the video decoding method established in the standard. The result is the decoded video data 20 with the transmission format chosen at the transmitter. The transmission format used may be different from the display format. In this case, the transmission format is converted (at 22) to the display format 24 used for that particular receiver.

In the future, as technologies such as video compression methods are improved, some of the bits presently required to encode video will become available for other uses. For example, as more accurate techniques are developed for estimating the motion vectors, the energy in the motion-compensated residual can be decreased, and thus the residual may be encoded with fewer bits at the same quantization noise level. These improvements in motion vector estimation can be incorporated in the transmitter independent of the established HDTV transmission standard.

The bits that are freed up as the result of such future improvements in the video compression technology could simply be used to reduce the quantization noise. This would improve the video quality to some extent, but not enough to reach the desired resolution goal (1000 lines, 60 frames/sec, PS). No matter how many bits are used to reduce the quantization noise, we cannot reach the desired resolution due to the reduction in resolution that occurs at the conversion to one of the standard HDTV transmission formats.

Figure 2A:
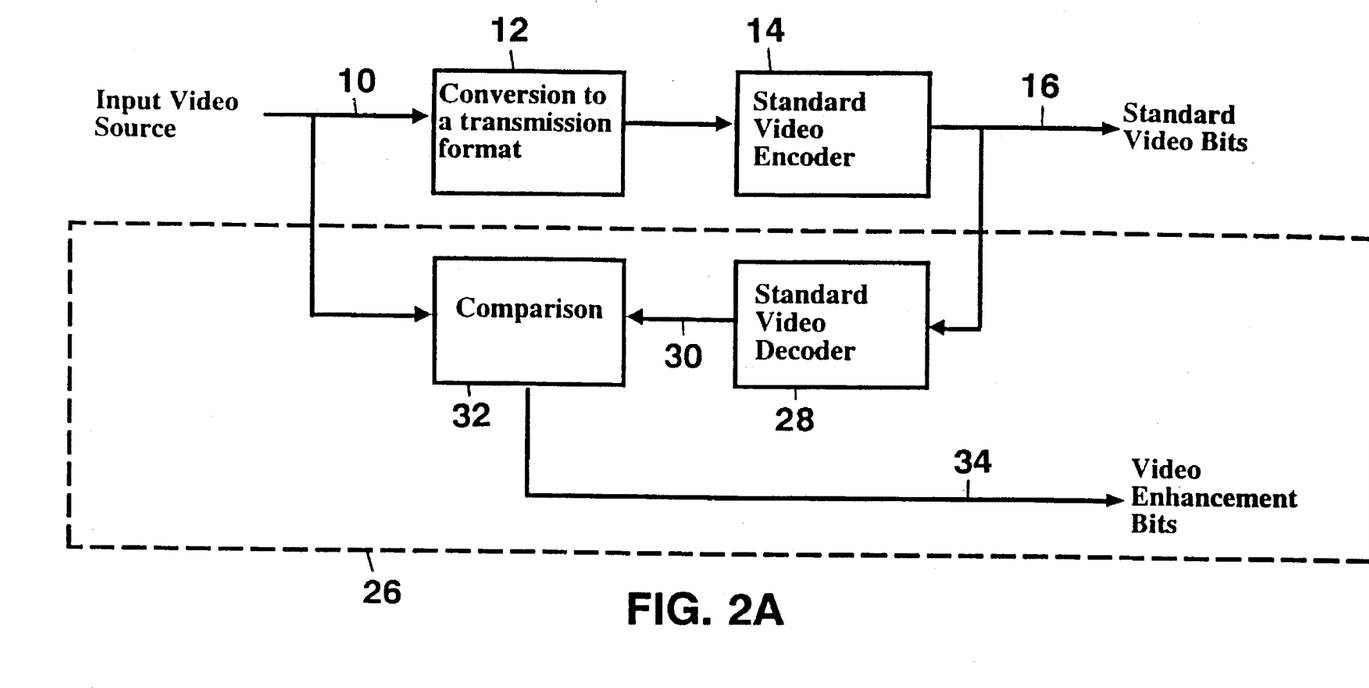
FIGS. 2A and 2B are block diagrams of the general organization of the transmitter and receiver of embodiments of the invention.
Figure 2B:
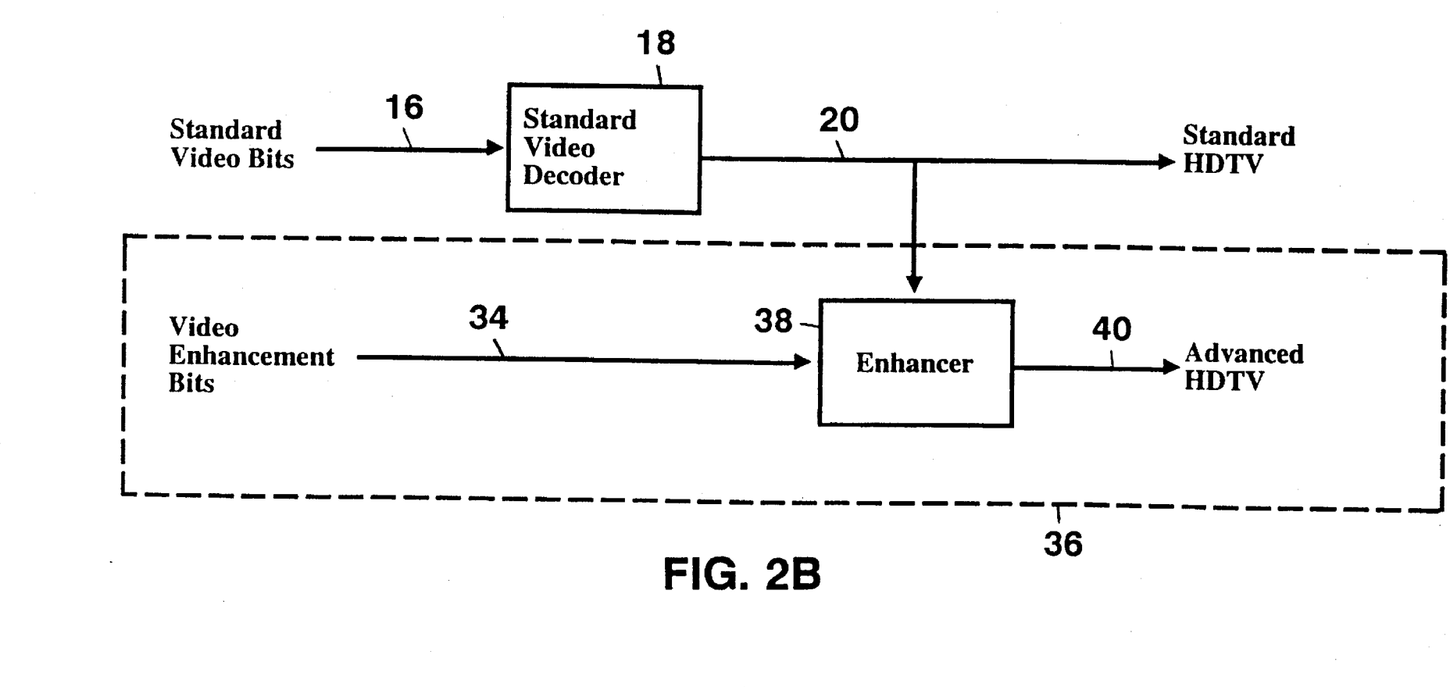

The invention establishes a migration path to reach the desired resolution goal, using the approach broadly illustrated in FIGS. 2A–2D. Referring first to FIGS. 2A and 2B, which show the invention in broad terms, enhancement operations are performed in the enhancement section 26 of the transmitter (FIG. 2A). The standard video bits 16 are decoded using the standard video decoder 28 (identical in function to decoder 18 in the standard receiver). The result 30 is compared (at 32) with the video source 10. Based on this comparison, enhancement data 34 referred to as "video enhancement bits" are generated. At the receiver (FIG. 2B), the standard HDTV receiver (depicted in the upper half of the figure) ignores the enhancement bits. An advanced HDTV receiver, which has an enhancement section 36, combines the enhancement bits 34 with the standard video bits (in enhancer 38) to reconstruct an Advanced HDTV output 40, closer to the video source. How much the enhancement bits will help depends on the efficiency of the enhancement method used and the number of bits allocated for enhancement.

The migration path provided by the enhancement sections shown in dashed lines in the transmitter (at 26 in FIG. 2A) and receiver (at 36 in FIG. 2B) do not have to be established now. When sufficient progress is made in the video compression technologies and enhancement methods, the standard for the enhancement method can be established.

Figure 2C:
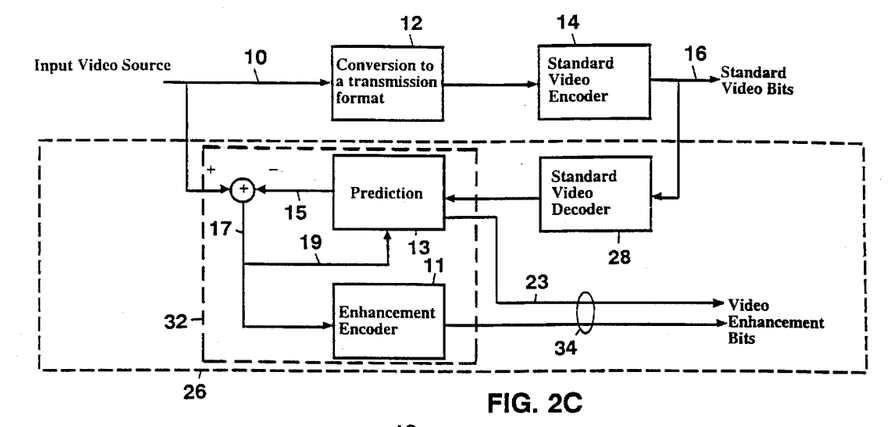
FIGS. 2C and 2D are block diagrams of the general organization of the transmitter and receiver, showing in more detail the function and organization of the comparison and enhancer blocks of FIGS. 2A and 2B.
Figure 2D:
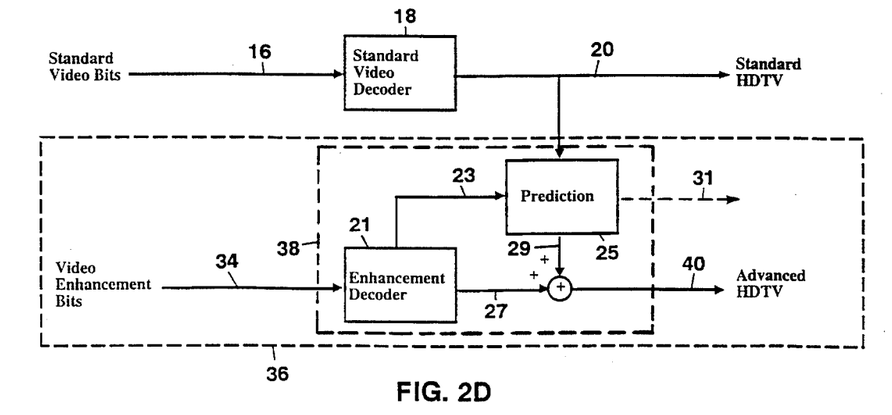

A more specific embodiment of the invention is shown in FIGS. 2C and 2D. The comparison performed by block 32 in the transmitter of FIG. 2A is shown in greater detail in FIG. 2C. The output of the standard video decoder is supplied to a prediction block 13 that generates a prediction of the original video signal (e.g., by spatial or temporal interpolation, or by deinterlacing). The prediction 15 is compared to the original video source 10, and the residual 17 is supplied to enhancement encoder 11. The type of prediction performed can vary depending on the size of the residual, and thus information on the residual is fed back (at 19) to the prediction block. Bits 23 descriptive of the type of prediction performed are included in the video enhancement bits 34. In the receiver (FIG. 2D), enhancer block 38 contains an enhancement decoder 21, which supplies bits 23 describing the prediction technique to prediction block 25, and the output 31 of the prediction block may be used without further processing (to reduce computations for example) or the output 29 may be summed with the decoded residual 27 to form the advanced HDTV output 40.

Figure 3A:
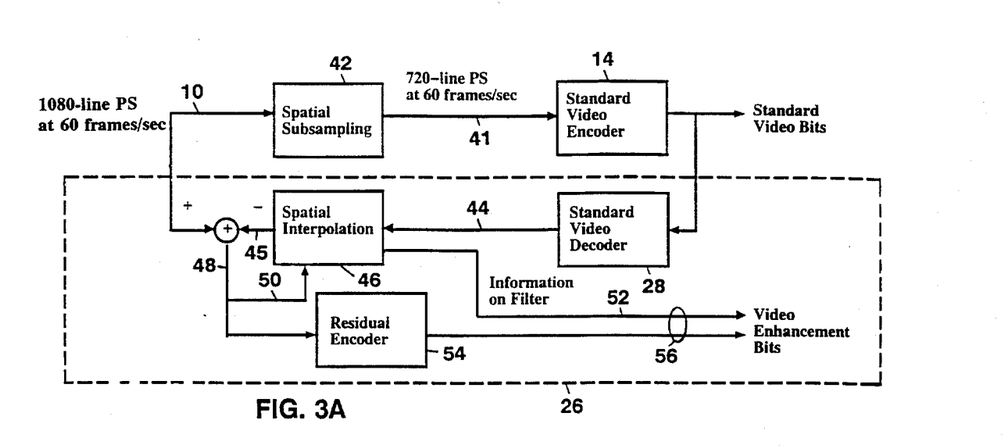
FIGS. 3A and 3B are block diagrams of an embodiment of the invention in which spatial interpolation is used for enhancing the standard HDTV signal.
Figure 3B:
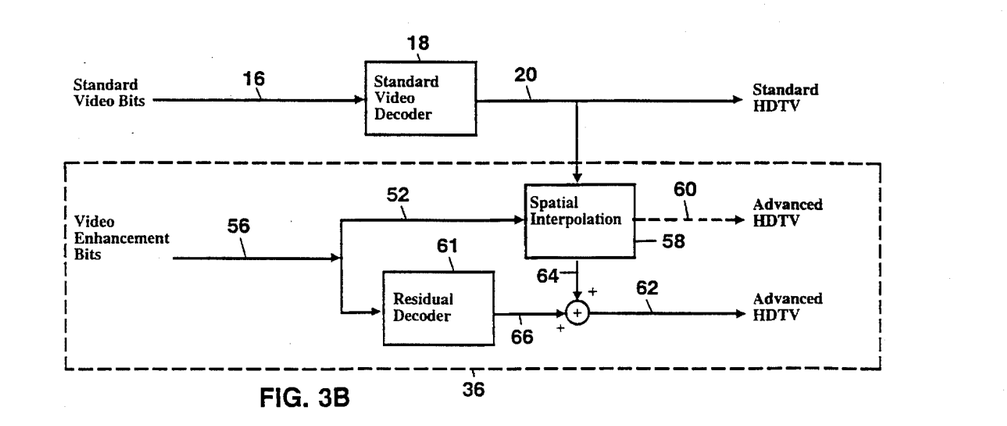

Three specific implementations of the invention are shown in FIGS. 3A, 3B (spatial interpolation), 4A, 4B (temporal interpolation), and 5A, 5B (interlaced to progressive scan conversion). In each example, we assume that the input video source is 1080-line PS at 60 frames/sec, the desired resolution goal for terrestrial broadcasting. Among the six transmission formats in Table 1, the three likely candidates to be used for 1080-line PS at 60 frames/sec are 720-line PS at 60 frames/sec (FIGS. 3A, 3B), 1080-line PS at 30 frames/sec (FIGS. 4A, 4B), and 1080-line IS at 60 fields/sec (FIGS. 5A, 5B).

Conversion to 720-line PS at 60 frames/sec

One method for enhancement when 1080-line PS at 60 frames/sec is converted to 720-line PS at 60 frames/sec is shown in FIGS. 3A and 3B. At the transmitter (FIG. 3A), the input video source 10 is 1080-line PS at 60 frames/sec. It is converted to 720-line PS at 60 frames/sec (at 41) by spatial subsampling (at 42). The 720-line images are encoded using the standard video encoder 14. In the transmitter enhancement section 26, a standard video decoder 28 is used to decode an estimate 44 of 720-line PS at 60 frames/sec. The estimated video 44 is then used to produce an estimate 45 of the 1080-line PS at 60 frames/sec using a spatial interpolation method 46. The estimate 45 is subtracted from the video source 10 to obtain the prediction residual 48, which is encoded by residual encoder 54 to produce video enhancement bits 56. Based on the prediction residual, the spatial interpolation method 46 is adjusted (as indicated by feedback line 50), and information 52 describing the chosen interpolation method is transmitted as part of the video enhancement bits 56. The choice of interpolation methods could be based on the prediction residual energy, and it could be changed on a frame-by-frame basis, block-by-block basis, or other basis. Having access to the original video source 10 is very helpful in choosing a good interpolation method. Moreover, the computations involved in the choice of the interpolation method are made not at the receiver but at the transmitter (where more processing capability can be provided).

A corresponding enhanced receiver is shown in FIG. 3B. If only a limited number of bits are available in the channel (e.g., because there has not yet been enough improvements in video compression technology to significantly reduce the number of bits required to encode the standard HDTV signal), the enhancement bits 56 may be limited to the bits 52 that describe the interpolation method. These bits are likely to be few in number, and yet providing them to a receiver could significantly enhance the video at the receiver. In such a receiver, these bits would be used to select the spatial interpolation method 58 (so that it corresponded to the method used in the transmitter), and the output of the spatial interpolator would be used as the advanced HDTV output 60 (dashed line).

If additional bits are available, they can be used to encode the prediction residual (at 54 in FIG. 3A), which is then decoded by residual decoder 61. A DCT-based encoding method or any new method developed in the future may be used. In this case, the output 64 of the spatial interpolation method is summed with the decoded residual 66 to form the advanced HDTV output 62.

The standard HDTV receiver (depicted in the upper half of FIG. 3B) would ignore the enhancement bits and use only the standard video bits. The advanced HDTV receiver would use the video enhancement bits to select the spatial interpolation method used. The interpolated video could be made significantly better than the video created by the standard HDTV receiver. The advanced HDTV receiver can also use the video enhancement bits to decode the prediction residual, which is then combined with the interpolated video. The more enhancement bits we have, the closer the result will be to the input source video.

Conversion to 1080-line PS at 30 frames/sec

Figure 4A:
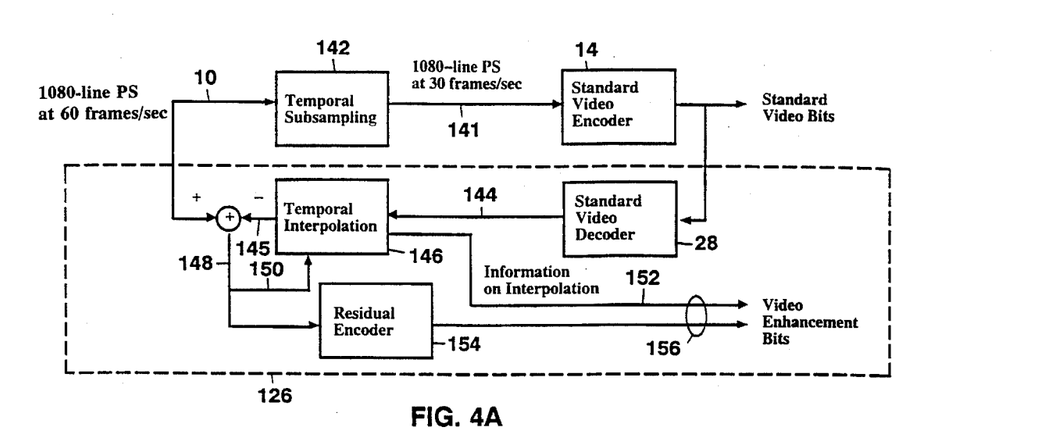
FIGS. 4A and 4B are block diagrams of an embodiment of the invention in which temporal interpolation is used for enhancing the standard HDTV signal.
Figure 4B:
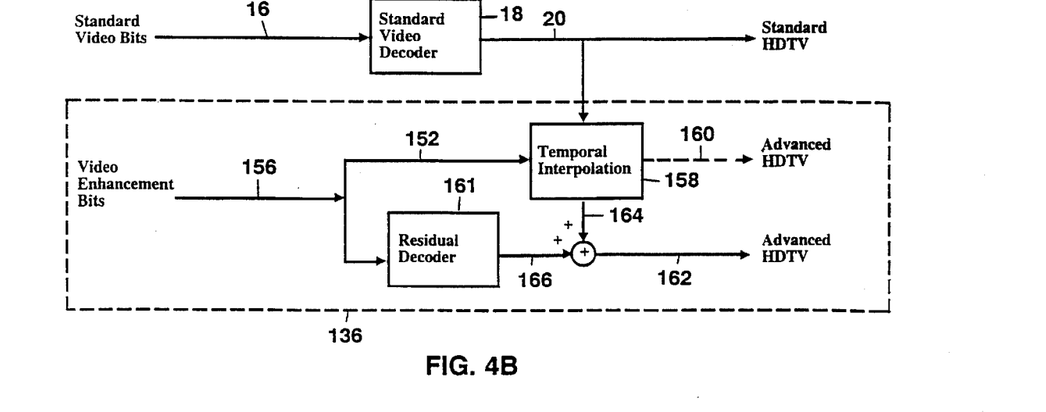
Figure 5A:
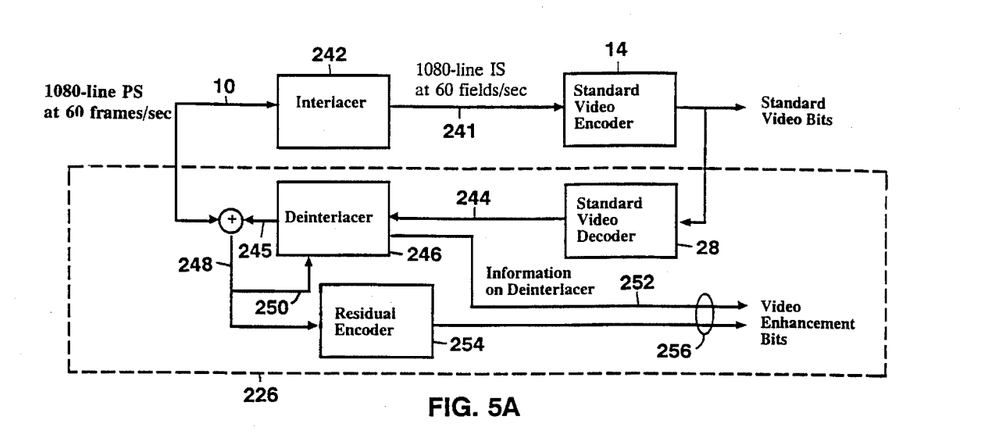
FIGS. 5A and 5B are block diagrams of an embodiment of the invention in which deinterlacing is used for enhancing the standard HDTV signal.
Figure 5B:
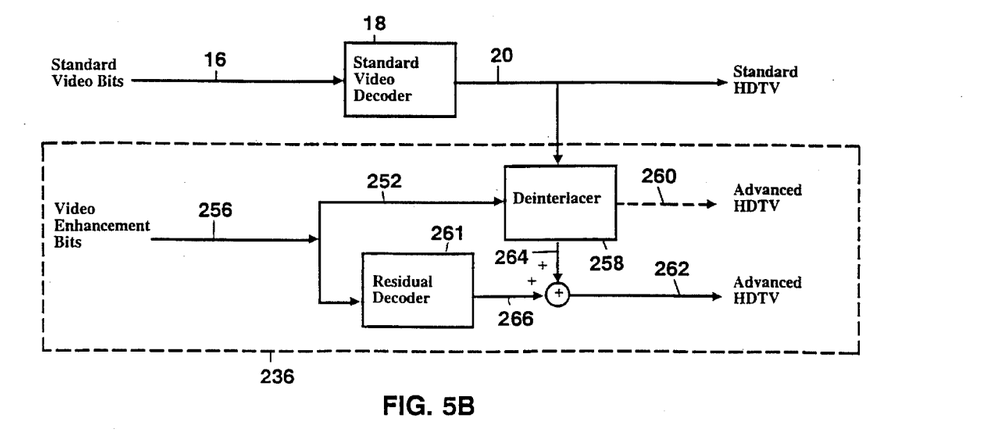

One method for enhancement when 1080-line PS at 60 frames/sec is converted to 1080-line PS at 30 frames/sec is shown in FIGS. 4A and 4B. The basic approach is the same as that in FIGS. 3A and 3B. Because of the temporal subsampling in the conversion from 1080-line PS at 60 frames/sec to 1080-line PS at 30 frames/sec (at 141), temporal interpolation is used. At the transmitter (FIG. 4A), the input video source 10 is 1080-line PS at 60 frames/sec. It is converted to 1080-line PS at 30 frames/sec (at 141) by temporal subsampling (at 142). The 1080-line, 30 frame/sec images are encoded using the standard video encoder 14. In the transmitter enhancement section 126, a standard video decoder 28 is used to decode an estimate 144 of 1080-line PS at 30 frames/sec. The estimated video 144 is then used to produce an estimate 145 of the 1080-line PS at 60 frames/sec using a temporal interpolation method 146. The estimate 145 is subtracted from the video source 10 to obtain the prediction residual 148, which is encoded by residual encoder 154 to produce video enhancement bits 156. Based on the prediction residual, the temporal interpolation method 146 may be adjusted (as indicated by feedback line 150), and information 152 describing the chosen temporal interpolation method is transmitted as part of the video enhancement bits 156. The choice of interpolation method could be based on the prediction residual energy, and it could be changed on a frame-by-frame basis, block-by-block basis, or other basis. As with the spatial interpolation approach used in FIGS. 3A and 3B, having access to the original video source 10 is very helpful in choosing a good interpolation method.

A corresponding enhanced receiver is shown in FIG. 4B. As with the spatial interpolation embodiment of FIGS. 3A and 3B, if only a limited number of bits are available in the channel, the enhancement bits 156 may be limited to the bits 152 that describe the interpolation method. In such a receiver, these bits would be used to select the temporal interpolation method 158 (so that it corresponded to the method used in the transmitter), and the output of the method would be used as the advanced HDTV output 160 (dashed line).

If additional bits are available, they can be used to encode the prediction residual (at 154 in FIG. 4A), which is then decoded by residual decoder 161. A DCT-based encoding method or any new method developed in the future may be used. In this case, the output 164 of the temporal interpolation method is summed with the decoded residual 166 to form the advanced HDTV output 162.

The standard HDTV receiver (depicted in the upper half of FIG. 4B) would ignore the enhancement bits and use only the standard video bits. The advanced HDTV receiver would use the video enhancement bits to select the temporal interpolation method used, and optionally to encode the prediction residual, which is then combined in the receiver with the temporally interpolated video. Since we have access to the original video source of 1080-line PS at 60 frames/sec, the interpolation method can be sophisticated and quite effective.

We can use motion compensated temporal interpolation, in which case we need to transmit the motion vectors. The motion vectors may be related to those used in the standard HDTV encoder. Again, the complex computations involved in the determination of the interpolation method (including estimation of motion vectors) are at the transmitter, not at the receiver. The more enhancement bits we have, the closer the resulting video will be to the original source video.

Conversion to 1080-line IS at 60 fields/sec

One method for enhancement when 1080-line PS at 60 frames/sec is converted to 1080-line IS at 60 fields/sec is shown in FIGS. 5A and 5B. The basic approach is the same as those in FIGS. 3A, 3B, 4A, and 4B. Because of the interlacer in the conversion from 1080-line PS at 60 frames/sec to 1080-line IS at 60 fields/sec, a deinterlacer is used in predicting the original source video. Again, because we have access to the original video source (and thus the original lines dropped in producing the interlaced image), and because the computations for deciding the type of deinterlacing (e.g., spatial or temporal) are done in the transmitter, the deinterlacer used can be sophisticated and quite effective (e.g., it could be a deinterlacer of the type described in publications by Faroudja, hereby incorporated by reference).

In performing the deinterlacing, a determination can be made as to whether to use spatial versus temporal interpolation on a line-by-line basis or even on a smaller unit basis than a line, and this information can be transmitted as part of the enhancement bits. If we have enough bits for enhancement, we can reconstruct video arbitrarily close to the original video source.

At the transmitter (FIG. 5A), the input video source 10 is 1080-line PS at 60 frames/sec. It is converted to 1080-line IS at 60 fields/sec (at 141) by interlacer 242. The 1080-line IS at 60 fields/sec images are encoded using the standard video encoder 14. In the transmitter enhancement section 226, a standard video decoder 28 is used to decode an estimate 244 of 1080-line IS at 60 fields/sec. The estimated video 244 is then used to produce an estimate 245 of the 1080-line PS at 60 frames/sec using a deinterlacer 246. The estimate 245 is subtracted from the video source 10 to obtain the prediction residual 248, which is encoded by residual encoder 254 to produce video enhancement bits 256. Based on the prediction residual, the deinterlacer 246 is adjusted (as indicated by feedback line 250), and information 252 describing the chosen deinterlacing technique (e.g., temporal or spatial interpolation) is transmitted as part of the video enhancement bits 256.

A corresponding enhanced receiver is shown in FIG. 5B. As with the embodiments of FIGS. 3B and 4B, if only a limited number of bits are available in the channel, the enhancement bits 256 may be limited to the bits 252 that describe the deinterlacer. In such a receiver, these bits would be used to select the deinterlacer 258 (so that it corresponded to the deinterlacer used in the transmitter), and the output of the deinterlacer would be used as the advanced HDTV output 260 (dashed line).

If additional bits are available, they can be used to encode the prediction residual (at 254 in FIG. 5A), which is then decoded by residual decoder 261. A DCT-based encoding method or any new method developed in the future may be used. In this case, the output 264 of the deinterlacer 258 is summed with the decoded residual 266 to form the advanced HDTV output 262.

The embodiments described so far constitute approaches that may be used in migrating towards the desired resolution goal after an HDTV standard is established. The proposed approaches utilize the channel capacity that may be released due to future advances in video compression technology. The released channel capacity is used to encode enhancement information. The standard HDTV receiver ignores the enhancement information, while an advanced HDTV receiver utilizes it to improve video quality. The method of enhancement can be established in the future. To illustrate the basic approach, we have used specific examples. We emphasize that the proposed approach is a very general method and is not limited to the specific cases used for illustration. For example, the approach can be used to reach a different resolution goal such as 1440-line PS at 60 frames/sec. The approach can also be used to increase the chrominance resolution. In a typical HDTV system, the luminance component is encoded with higher resolution than the chrominance component. The general approach is also applicable to choices of the transmission formats different from those in Table I. The approach is also applicable to enhancement methods other than those used in FIGS. 3A–5B.

In the embodiments described so far, we have assumed that the channel capacity utilized for enhancement information comes from future improvement in video compression technology such as more accurate motion estimation that can be incorporated in a standard-independent manner. If we develop new methods that encode the enhancement information very efficiently, we may even want to take some bits away from the standard video encoder. This will have the undesirable effect of reducing the video quality received by a standard HDTV receiver. But if the benefit coming from the enhancement information is high enough, this may be considered in the future.

Figure 6A:
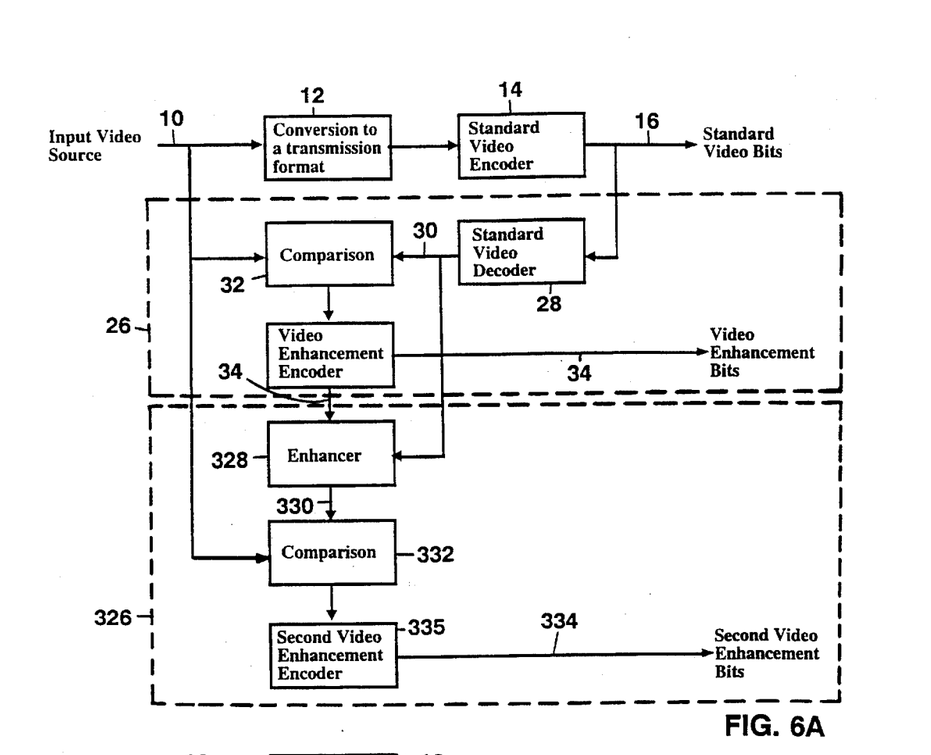
FIGS. 6A and 6B are block diagrams of the transmitter and receiver of another embodiment of the invention in which a second enhancement section has been added to the enhancement section of FIGS. 2A and 2B.
Figure 6B:
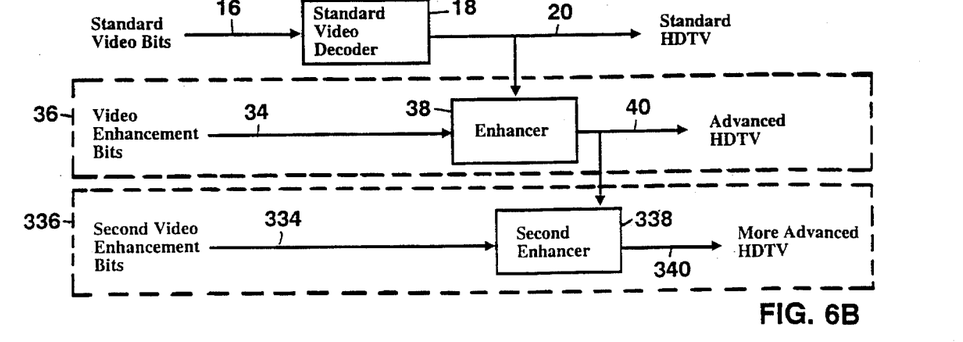

The invention can be used repeatedly in the future. For example, suppose we standardize an enhancement method such as shown in FIGS. 3A–5B. The standard for encoding enhancement data will be based on the technology available at that time. Suppose we establish a standard for encoding the enhancement information that allows us to reach the resolution goal of 1080-line PS at 60 frames/sec. As video compression technologies improve further and the bits required for the standard video bits and enhancement bits are reduced further, we can establish another standard for further enhancement. For example, to reach 1440-line PS at 60 frames/sec, the standard HDTV receivers will ignore all the enhancement bits. The advanced HDTV receiver will ignore only the enhancement bits from the second enhancement standard. The more advanced HDTV receivers will utilize all the enhancement bits. Such a two-level enhancement is shown in FIGS. 6A and 6B. The transmitter (FIG. 6A) and receiver (FIG. 6B) are each divided into three sections, the standard and first enhancement sections are essentially identical to those shown in FIGS. 2A and 2B. The second enhancement section 326 of the transmitter includes an enhancer 328 that duplicates the function of enhancer 38 in the first enhancement section of the receiver, so that the output 330 of enhancer 328 is an estimate of advanced HDTV output 40 in the first enhancement section in the advanced HDTV receiver. That output is then further enhanced in the second enhancement section by comparing (at 332) the original input video source 10 to the first enhanced output 328. This second residual is encoded (at 335) and transmitted as second video enhancement bits 334. In the receiver (FIG. 6B), there is a second enhancement section 336, which uses the second set of enhancement bits 334 to feed a second enhancer 338 to produce a more advanced HDTV output 340.

Three different types of receivers are now able to receive the signal transmitted by the transmitter of FIG. 6A. Receivers built in conformance with the original HDTV standard will lack both the first and second enhancement sections 36, 336, and ignore both the first and second sets of video enhancement bits 34, 334. Receivers built in conformance with the first enhanced HDTV standard will have only the first enhancement section 36, and will ignore only the second set of video enhancement bits 334. Receivers built in conformance with the second enhanced HDTV standard will have all of the structure shown in FIG. 6B. Further enhancements beyond the first and second ones shown are also possible.

Figure 7A:
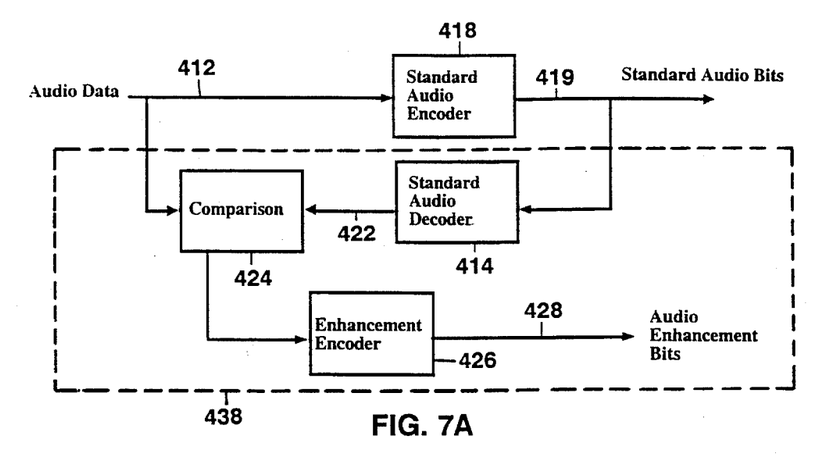
FIGS. 7A and 7B are block diagrams of the transmitter and receiver of another embodiment of the invention in which audio, rather than video, is enhanced.
Figure 7B:
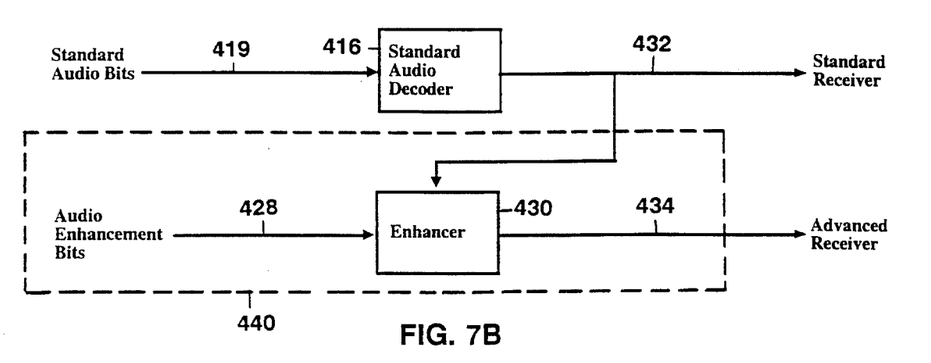

The invention can also be used to enhance the audio signal, as illustrated in FIGS. 7A and 7B. The audio case, however, is not the same as the video case in the HDTV environment. In the video case, for example, providing more bits to the standard video encoder in encoding 1080-line PS at 30 frames/sec will not recreate the original 1080-line PS at 60 frames/sec. Some video information has been lost when 1080-line PS at 60 frames/sec is converted to 1080-line PS at 30 frames/sec. In the audio case, the bit requirements are relatively small and enough bits are given to encode audio quite well without conversion to a lower quality audio format. Therefore, simply providing more bits to the standard audio encoder will reproduce the original audio as accurately as we wish. In addition, as we make improvements in audio technology that can be incorporated in a standard-independent manner, the audio will continue to approach the original audio.

The approach in FIGS. 7A and 7B may be useful if we develop a new method that can encode the enhancement information very efficiently. In this case, giving bits to the new enhancement encoder 420 may be more effective than giving the same number of bits to the standard audio encoder 418. As with the video embodiments, the enhanced transmitter has an enhancement section 438, in which a standard audio decoder 414 (identical to the decoder 416 in the receiver) produces an estimate 422 of the standard decoded audio signal. That estimate is compared (at 424) to the original audio 412, and information on the residual and the nature of the comparison are encoded (at 426) and transmitted as audio enhancement bits 428. In the receiver (FIG. 7B), an enhancement section 440 receives the audio enhancement bits 428 and supplies them to enhancer 430, which uses the enhancement bits to process the standard decoded audio 432 to produce an advanced audio output 434.

Another example where the approach in FIGS. 7A and 7B may be useful is in applications where audio is converted to a lower quality audio format (by lowpass filtering, for example) prior to encoding (due to bit rate requirements). In this case, the audio situation is similar to the video situation, and the same general remarks made with respect to video enhancement will also apply to audio.

Another application for the invention is to have a common baseline system among HDTV signals distributed through different communications media. Specifically, transmission media such as cable and satellite do not have the same constraints imposed by the terrestrial environment and may provide more bits than the terrestrial channel. In this case, we can establish an enhancement standard for cable now and utilize the additional bits to encode the enhancement data. A standard HDTV receiver will be able to decode standard video bits received over the air or through cable. An advanced television receiver for cable will be able to utilize not only the standard video bits received over the air or through cable but also the enhancement bits received through cable. Of course, the enhancement standard for terrestrial broadcasting to be established in the future does not have to be the same as that established for cable. The advantage of this approach is that the basic HDTV system is the same for different transmission media, which will result in cost reduction for consumers.

Other embodiments are within the following claims. The invention has been described in reference to the HDTV standard, but is applicable to providing enhancements to other video or audio standards (for example, digital NTSC) subsequent to their adoption. The enhancement and standard sections of the receivers could be combined in the enhanced receivers (e.g., by combining the standard video decoder 18 and enhancer 38 into one set of operations; FIGS. 2B and 2D), as there would ordinarily be no need to produce a standard HDTV output in such receivers). Although the discussion has focused on improvements to the quality of a transmitted television signal, the invention is, of course, suited to improving the quality of stored as well as transmitted images (when "transmitting" is used it should be understood to include storing). Similarly, the invention is capable of improving not only the resolution of transmitted and stored images, but other aspects of image quality.

What is claimed is:

1. A method of receiving and decoding a television signal representing an input video source, wherein the television signal has been encoded using a method comprising the steps of encoding a first set of bits using a first transmission standard, the first set of bits representing images at a first quality and being capable of being decoded to provide an output at a first quality, and encoding a second set of bits using a second transmission standard, the second set of bits representing enhancement information that can be decoded and used in the receiver with the first set of bits to provide an output at a second quality greater than the first quality, wherein the second transmission standard comprises the steps of decoding the first set of bits to produce an estimate of the decoded images at a first quality, and comparing the estimate to the input video source and using the results of the comparison to produce the second set of bits, the method of receiving and decoding comprising the steps of:

decoding the first set of bits according to a first decoding procedure to provide information representative of images at the first quality;

decoding the second set of bits according to a second decoding procedure to provide the enhancement information; and combining the enhancement information with the information representative of the images at the first quality to provide output at the second quality.

2. The method of claim 1 wherein
   said first and second quality comprise first and second resolutions.

3. The method of claim 1 wherein the second transmission standard further comprises the steps of processing the estimate with a prediction method to produce a predicted signal for the input video source and encoding information representative of the prediction method for use by the decoder.

4. The method of claim 3 wherein the comparison step comprises comparing the predicted signal to the input video source and using the difference in producing the second set of bits.

5. The method of claim 1 wherein
   the step of decoding the second set of bits comprises the steps of
      decoding a portion of the bits to provide information representative of a prediction method to be used to transform images from the first to the second quality, and
      using the information to select the prediction method from among a plurality of prediction methods; and
   the step of using at least some of the enhancement information comprises the step of using the prediction method selected from the plurality of prediction methods to generate the output at the second quality.

6. The method of claim 5 wherein the television signal has been transmitted using a third set of bits that represents second enhancement information and that can be decoded and used in conjunction with the first and second sets of bits to provide an output at a third quality greater than the first and second qualities, wherein the method further comprises the steps of decoding the third set of bits according to a third decoding procedure to provide the second enhancement information;

using at least some of the second enhancement information, and at least some of the first-mentioned enhancement information, and at least some of the information representative of images at the first quality to provide the output at the third quality.

7. The method of claim 5 wherein the step of using at least some of the enhancement information further comprises the steps of decoding the enhancement information to provide an identification of a prediction method used in an encoder in a transmitter transmitting the television signal, using the identification to select the prediction method used in the encoder from a plurality of prediction methods, and using the prediction method selected from the plurality of prediction methods to process the information representative of images at the first quality to form predictions of images at the second quality.

8. The method of claim 7 wherein the predictions of images at the second quality are used as the output at the second quality.

9. The method of claim 7 wherein the steps of decoding the enhancement information further includes the steps of
decoding a residual computed at the transmitter that represents the difference between predictions of the input video source and the input video source itself; and
combining the decoded residual and the predictions of the input video source to form the output at the second quality.

10. The method of claim 5 or 9 wherein the prediction method selected from the plurality of prediction methods uses spatial interpolation.

11. The method of claim 10 wherein the spatial interpolation is done by filtering.

12. The method of claim 5 or 9 wherein the prediction method selected from the plurality of prediction methods uses deinterlacing.

13. The method of claim 12 wherein the enhancement information includes information representative of a type of deinterlacing, the prediction method selected from the plurality of prediction methods using the type of deinterlacing.

14. The method of claim 5 or 9 wherein the prediction method selected from the plurality of prediction methods uses temporal interpolation.

15. The method of claim 14 wherein the temporal interpolation is done by filtering.

16. The system of claim 14 wherein the temporal interpolation is done by filtering.

17. A method of receiving and decoding an audio signal, the audio signal representing an input audio source, wherein the audio signal has been transmitted in a format comprising a first set of bits that represents audio at a first quality and that can be decoded to provide an output at the first quality, and a second set of bits that represents enhancement information and that can be decoded and used in conjunction with the first set of bits to provide an audio output at a second quality greater than the first quality, the method of receiving and decoding comprising the steps of:
decoding the first set of bits according to a first decoding procedure to provide information representative of audio at the first quality;
decoding the second set of bits according to a second decoding procedure to provide the enhancement information;
using at least some of the enhancement information and at least some of the information representative of audio at the first quality to provide the output at the second quality.

18. The method of claim 17 wherein the first and second quality comprise first and second accuracies.

19. The method of claim 17 wherein the audio signal is an audio portion of a television signal.

20. A system for receiving and decoding a television signal representing an input video source, wherein the television signal has been encoded by
encoding a first set of bits using a first transmission standard, the first set of bits representing images at a first quality and being capable of being decoded to provide an output at a first quality, and
encoding a second set of bits using a second transmission standard, the second set of bits representing enhancement information that can be decoded and used in the receiver with the first set of bits to provide an output at a second quality greater than the first quality,
wherein the second transmission standard comprises the steps of decoding the first set of bits to produce an estimate of the decoded images at a first quality, and comparing the estimate to the input video source and using the results of the comparison to produce the second set of bits,
the system for receiving and decoding comprising:
means for decoding the first set of bits according to a first decoding procedure to provide information representative of images at the first quality;
means for decoding the second set of bits according to a second decoding procedure to provide the enhancement information; and
means for combining the enhancement information with the information representative of the images at the first quality to provide output at the second quality.

21. The system of claim 20 wherein the second transmission standard further comprises processing the estimate with a prediction method to produce a predicted signal for the input video source and encoding information representative of the prediction method for use by the decoder.

22. The method of claim 21 wherein the comparison comprises comparing the predicted signal to the input video source and using the difference in producing the second set of bits.

23. The system of claim 20 wherein
said first and second quality comprise first and second resolutions.

24. The system of claim 23 wherein
the means for decoding the second set of bits comprises means for decoding a portion of the bits to provide information representative of a prediction method to be used to transform images from the first to the second quality, and
means for using the information to select the prediction method from among a plurality of prediction methods; and
the means for using at least some of the enhancement information comprises using the prediction method selected from the plurality of prediction methods to generate the output at the second quality.

25. The system of claim 24 wherein the television signal has been transmitted using a third set of bits that represents second enhancement information and that can be decoded and used in conjunction with the first and second sets of bits to provide an output at a third quality greater than the first and second qualities, wherein the system further comprises
means for decoding the third set of bits according to a third decoding procedure to provide the second enhancement information;

26. The system of claim 24 wherein the means for using at least some of the enhancement information further comprises
means for decoding the enhancement information to provide an identification of a prediction method used in an encoder in a transmitter transmitting the television signal,
means for using the identification to select the prediction method used in the encoder from a plurality of prediction methods, and
means for using the prediction method selected from the plurality of prediction methods to process the information representative of images at the first quality to form predictions of images at the second quality.

27. The system of claim 26 wherein the predictions of images at the second quality are used as the output at the second quality.

28. The system of claim 26 wherein the means for decoding the enhancement information further includes
   means for decoding a residual computed at the transmitter that represents the difference between predictions of the input video source and the input video source itself; and
   means for combining the decoded residual and the predictions of the input video source to form the output at the second quality.

29. The system of claim 24 or 28 wherein the prediction method selected from the plurality of prediction methods uses temporal interpolation.

30. The system of claim 24 or 28 wherein the prediction method selected from the plurality of prediction methods uses spatial interpolation.

31. The system of claim 30 wherein the spatial interpolation is done by filtering.

32. The system of claim 24 or 28 wherein the prediction method selected from the plurality of prediction methods uses deinterlacing.

33. The system of claim 32 wherein the enhancement information includes information representative of a type of deinterlacing, the prediction method selected from the plurality of prediction methods using the type of deinterlacing.
   means for using at least some of the second enhancement information, and at least some of the first-mentioned enhancement information, and at least some of the information representative of images at the first resolution to provide the output at the third quality.

34. A system of receiving and decoding an audio signal, the audio signal representing an input audio source, wherein the audio signal has been transmitted in a format comprising a first set of bits that represents audio at a first quality and that can be decoded to provide an output at the first quality, and a second set of bits that represents enhancement information and that can be decoded and used in conjunction with the first set of bits to provide an audio output at a second quality greater than the first quality, the system of receiving and decoding comprising:
   means for decoding the first set of bits according to a first decoding procedure to provide information representative of audio at the first quality;
   means for decoding the second set of bits according to a second decoding procedure to provide the enhancement information;
   means for using at least some of the enhancement information and at least some of the information representative of audio at the first quality to provide the output at the second quality.

35. The system of claim 34 wherein the first and second quality comprise first and second accuracies.

36. The system of claim 34 wherein the audio signal is an audio portion of a television signal.

37. A method of encoding a television signal representing an input video source, comprising the steps of:
   using a first transmission standard to encode the input video source to produce an encoded signal, the encoded signal being of a lower quality than the quality of the input video source;
   using a second transmission standard to encode enhancement bits to permit the decoder to enhance the signal decoded from the encoded signal;
   the second transmission standard comprising the steps of
      decoding the encoded signal using a plurality of prediction methods to produce a plurality of estimates of the input video source, each estimate differing from the input video source by a residual;
      selecting a prediction method from the plurality of prediction methods by one of the following steps:
         selecting a prediction method based on the degree to which the estimate approaches the quality of the input video source;
         selecting a prediction method based on the efficiency by which the residual can be encoded using the second transmission standard;
      encoding information representative of the prediction method for use by the decoder.

38. The method of claim 37 wherein the prediction method comprises spatial interpolation.

39. The method of claim 37 wherein quality is measured in image resolution.

40. The method of claim 39 wherein as part of the encoding under the first transmission standard the input video source is subsampled or converted to a lower resolution scanning format, to thereby reduce its resolution to one of a set of standard resolutions of the first transmission standard.

41. The method of claim 40 wherein the input video source is converted from a progressively scanned format to an interlaced scanned format.

42. The method of claim 41 wherein the prediction method comprises deinterlacing to restore the image to the progressive scanning format of the input video source.

43. The method of claim 40 wherein the input video source is subsampled by one of spatial subsampling and temporal subsampling.

44. The method of claim 43 wherein the prediction method comprises interpolation corresponding to the subsampling performed as part of the first transmission standard.

45. The method of claim 44 wherein the subsampling is spatial subsampling and the prediction method comprises spatial interpolation.

46. The method of claim 44 wherein the subsampling is temporal subsampling and the prediction method comprises temporal interpolation.

47. A system for encoding a television signal representing an input video source, comprising:
   means for using a first transmission standard to encode the input video source to produce an encoded signal, the encoded signal being of a lower quality than the quality of the input video source;
   means for using a second transmission standard to encode enhancement bits to permit the decoder to enhance the signal decoded from the encoded signal;
   the second transmission standard comprising the steps of
      decoding the encoded signal using a plurality of prediction methods to produce a plurality of estimates of the input video source, each estimate differing from the input video source by a residual;
      selecting a prediction method from the plurality of prediction methods by one of the following steps:
         selecting a prediction method based on the degree to which the estimate approaches the quality of the input video source;
         selecting a prediction method based on the efficiency by which the residual can be encoded using the second transmission standard;
      encoding information representative of the prediction method for use by the decoder.

48. The system of claim 47 wherein the prediction method comprises spatial interpolation.

49. The system of claim 47 wherein quality is measured in image resolution.

50. The system of claim 49 wherein as part of the encoding under the first transmission standard the input video source is subsampled or converted to a lower resolution scanning format, to thereby reduce its resolution to one of a set of standard resolutions of the first transmission standard.

51. The system of claim 50 wherein the input video source is converted from a progressively scanned format to an interlaced scanned format.

52. The system of claim 51 wherein the prediction method comprises deinterlacing to restore the image to the progressive scanning format of the input video source.

53. The system of claim 50 wherein the input video source is subsampled by one of spatial subsampling and temporal subsampling.

54. The system of claim 53 wherein the prediction method comprises interpolation corresponding to the subsampling performed as part of the first transmission standard.

55. The system of claim 54 wherein the subsampling is spatial subsampling and the prediction method comprises spatial interpolation.

56. The system of claim 54 wherein the subsampling is temporal subsampling and the prediction method comprises temporal interpolation.

* * * * *

UNITED STATES PATENT AND TRADEMARK OFFICE
CERTIFICATE OF CORRECTION

PATENT NO.   : 5,508,746

DATED        : April 16, 1996

INVENTOR(S)  : Jae S. Lim

It is certified that error appears in the above-identified patent and that said Letters Patent is hereby corrected as shown below:

Col. 14, line 50, after "information;" insert the following new paragraph:

--means for using at least some of the
    second enhancement information, and at least some
    of the first-mentioned enhancement information,
    and at least some of the information
    representative of images at the first resolution
    to provide the output at the third quality.--

Col. 15, delete lines 24-28.

Signed and Sealed this

Twenty-fourth Day of September, 1996

Attest:

BRUCE LEHMAN

*Attesting Officer*   *Commissioner of Patents and Trademarks*